April 27, 1954

C. F. ZAMPIERI 2,676,436

AUTOMATIC CONTINUOUS PRESS FOR MOLDING GLASS ARTICLES

Filed March 26, 1951

INVENTOR.
CARLOS FORTUNATO ZAMPIERI
ATTORNEYS

April 27, 1954 C. F. ZAMPIERI 2,676,436
AUTOMATIC CONTINUOUS PRESS FOR MOLDING GLASS ARTICLES
Filed March 26, 1951 3 Sheets-Sheet 3

Inventor
CARLOS FORTUNATO ZAMPIERI
By
Attorneys

Patented Apr. 27, 1954

2,676,436

UNITED STATES PATENT OFFICE 2,676,436

AUTOMATIC CONTINUOUS PRESS FOR MOLDING GLASS ARTICLES

Carlos F. Zampieri, Banfield, Argentina, assignor to Cristalerias Rigolleau Sociedad Anonima, Buenos Aires, Argentina Application March 26, 1951, Serial No. 217,459

9 Claims. (Cl. 49—37)

This invention relates to an automatic continuous press for molding glass articles under pressure wherein all the movements of the different moving parts of the machine and also the charging of the molds with molten glass, are brought about by the use of mechanical means operating in timed relationship.

Continuous presses of this type are provided with two or more mold-supporting discs or turrets mounted for rotary movement on a likewise rotary platform or table, and the charge of the molten glass is introduced into the corresponding mold while the table is rotating, that is, while the mold is moving.

In order to properly manufacture the molded article and in order that the final quality be of the highest possible order, it is necessary to assure that the charge of molten glass, when introduced into the mold from the automatic feeder should fall into the mold properly centered, and thus there arose the problem of achieving that a glass charge was mechanically and automatically centered in the moving mold. It was thought possible that this problem could be solved by adjusting the movement of the feeder in relation to the speed of the mold-supporting platform or table, but since obviously such adjustment is only possible within certain limits, such procedure did not solve the problem satisfactorily.

In view of these difficulties attempts have been made of associating with the continuous press such mechanisms that the combination of movements to which the mold is subjected, will result in said mold remaining practically at a standstill at the time of receiving the charge of molten glass. Presses showing this feature actually have been constructed.

In said continuous presses the table or platform is given a constant rotary movement of uniform speed, and the mold-supporting plates or turrets are also adapted to rotate at given instants, the movements being so timed that at the moment of charging the molten glass, the mold is effecting two movements, viz., a translational motion in the direction of the rotation of the table, and a movement in the opposite direction, due to the circular movement imparted thereto by the mold-supporting disc on which it is mounted, these movements being combined in such a manner that the speed at which the center of the mold moves in one direction due to the movement of the table, will be equal, but opposite in direction to the speed of the movement caused by the rotation of the mold-supporting disc. In this manner, with the center of the mold subjected to two movements of equal speed in opposite directions, said movements will cancel each other, whereby at the time of charging, the mold will remain stationary.

As mentioned above, machines meeting this condition have already been designed, but the mechanisms by means of which this condition of movements is attained have various drawbacks. In fact, the intermittent rotary motion of the mold-supporting disc relative to the table or platform is caused by means of the meshing of a gear-wheel carried on the shaft of the mold-supporting disc, with a toothed segment fixed to the machine structure. Since the shaft of the mold-supporting disc is driven at a uniform speed from the rotary table, the shocks produced by said gears with each revolution of the platform will develop in the mechanism excessive tensions which cannot be avoided even by employing pneumatic shock absorbers which give the members a certain resiliency and reduce the violence of the impact. This obviously shortens the life of the machine, and therefore one of the objects of the present invention is to provide a mechanical solution allowing the acceleration of the movement to be controlled and causing both the connection and disconnection of movable and fixed members to take place very smoothly, without causing excessive tensions of any nature.

Also, in the machines designed heretofore, the mold-supporting discs or turrets are each provided with two molds placed diametrically opposite each other, whereby useful space on the mold-supporting disc or turret is wasted. The use of this space has also been considered, and for this purpose the present invention proposes to use three molds on each disc whereby the yield of the press will be 50% higher than with two-mold discs. In this connection, the three molds are equally spaced one from another at angles of 120° and each time the mold-supporting disc moves it rotates over an angle of 240°, whereby one given mold will return to its initial position relative to the table once every two turns of the mold-supporting disc, after having assumed three different positions. Upon passing from the first position to the second position, at a given time when the translational speed (in the direction of rotation of the disc) thereof balances off the speed at which the platform or table moves in opposite direction, the charging of the mold takes place and the mold continues moving until it reaches the second position at 240° from the first position in which second position the charge of molten glass is pressed. After this operation and by means of a further rotation over 240°, the mold will pass to the third position, corresponding to the discharge of the pressed article, whereafter the mold remains free so that, upon again rotating over 240°, it will return to its initial position.

The execution of these movements, particularly as regards the smooth and intermittent movement of the mold-supporting disc, has been attained with the aid of a Geneva gear mechanism wherein the rotational speed of the gear is variable, as is well known, starting from zero to a maximum value and then decreasing again to zero. Advantage is taken of the characteristics of this motion in order to operate the mold-supporting disc or turret, which is driven from the Geneva gear through a train of gears, the first of which is integral with said Geneva gear which is in turn operated by means of the corresponding pin of a gear wheel rotating in uniform circular motion.

The press is duly provided with the male press members and the invention also comprises other structural and functional details which will appear in the course of this description.

In order that the invention may be clearly understood and readily carried out, a preferred embodiment thereof has been schematically illustrated by way of example in the accompanying drawings, in which.

The same reference characters have been used in order to indicate equal or corresponding parts or elements throughout the several figures.

Figure 1:
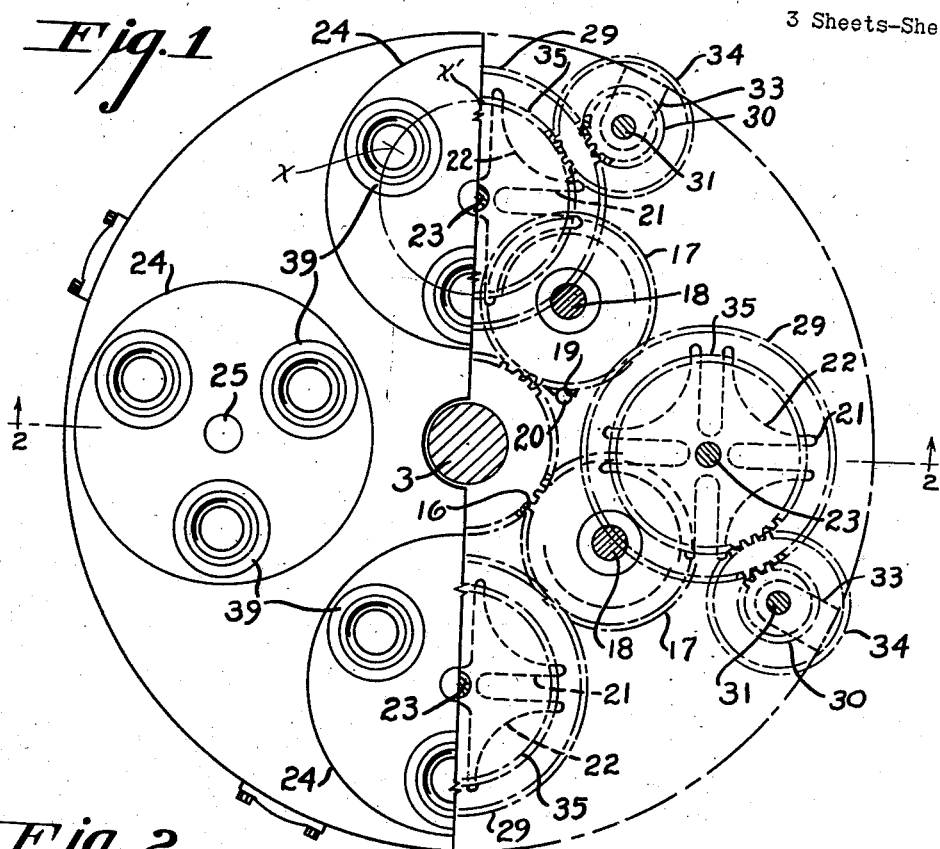
Fig. 1 is a plan view of the rotary platform or table of a continuous press according to the invention, diametrically cross-sectioned so as to show, on one half, the mold-carrying discs or turrets with the respective molds, and on the other half the series of mechanisms arranged underneath the platform or table for providing the different movements, along the line A—B of Fig. 2.

For better understanding of the mechanisms, they will first be described with particular reference to the schematic views in Figs. 4 and 5, wherein the elements are shown in alignment.

The reference numeral 1 indicates the machine frame, provided with a central bore 2 in which a central column 3 is fitted and fixed. Around said column and near the base thereof there is provided a gear 4 the hub of which rests on a ball-bearing 5. Said gear meshes with a gear 6 mounted on a shaft 7 suitably secured and on which there is fixed a further helical gear 8 driven by means of an endless screw 9 receiving its motion from a motor (not shown).

Gear 4 is secured by means of screws 10 to a bushing 11 surrounding the column 3, and the rotary platform or table 12 of the press is in turn secured to said bushing. Firmly secured to the machine frame is a supporting structure 13 located above the gears 4 and 6, to which structure is secured the lower flange 14 of a bushing 15, the upper side of which constitutes a gear 16, the latter being therefore fixed.

Meshing with said gear 16 is a gear 17 mounted on the lower end of a downwardly extending shaft 18 the upper end of which is fixed to the platform or table 12. Thus, when the table is rotated, shaft 18 will travel over a circular path and, since gear 17 is engaged with the fixed gear 16, the gear 17 will rotate. The periphery of gear 17 carries a lug 19 the free end of which is provided with a pin 20 adapted to engage the grooves 21 of a Geneva gear 22 freely mounted on a shaft 23 depending from the mold-carrying disc or turret 24. The upper end 25 of shaft 23 is enlarged and housed in a central recess 26 formed in disc 24. On the bottom of said recess said enlarged end 25 is supported by means of a ball-bearing 27.

Secured by means of screws 28 to the underside of Geneva gear 22 is a gear 29 meshing with a further gear 30 mounted on a shaft 31 the upper part of which is properly guided since it extends into a recess 32 formed in the table 12, whereas the lower end of said shaft 31 rests on a bracket 33 fixed to the periphery of the platform or table 12. On said shaft 31 there is mounted a further gear 34 meshing with a gear 35 freely mounted on shaft 23, said gear 35 being secured to the mold-carrying disc or turret 24 by means of screws 36, whereby said gear will drive said disc which is rotated relative to the table 12, ball bearings 37 being provided for facilitating said rotation.

The upper face of the mold-carrying disc or turret 24 is provided with suitable recesses 38 for housing therein three molds 39 angularly displaced at 120° from each other.

Figure 4:
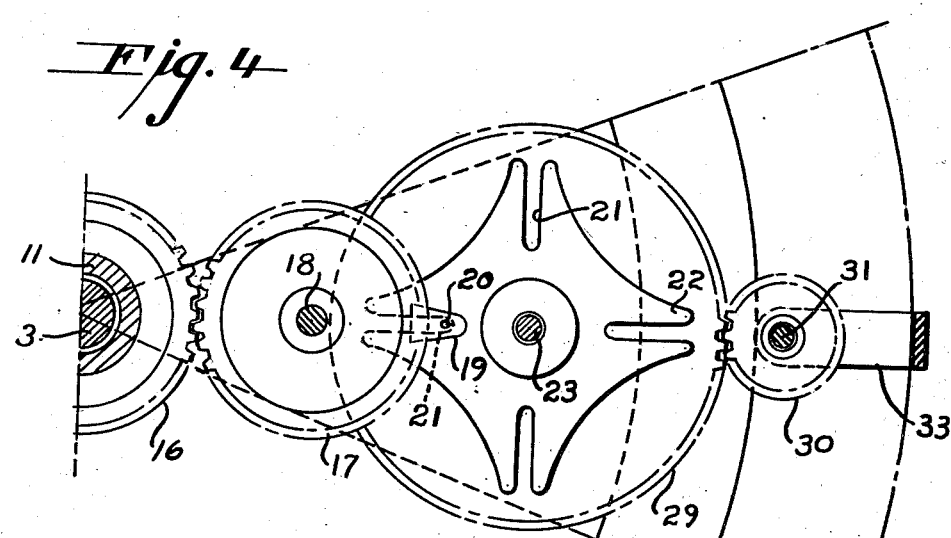
Fig. 4 is a schematic plan view of a set of parts causing an intermittent rotation of the mold-supporting disc or turret (according to the plane C—D of Fig. 5) but with these parts arranged in radial alignment for the sole purpose of facilitating the explanation of the device.
Figure 5:
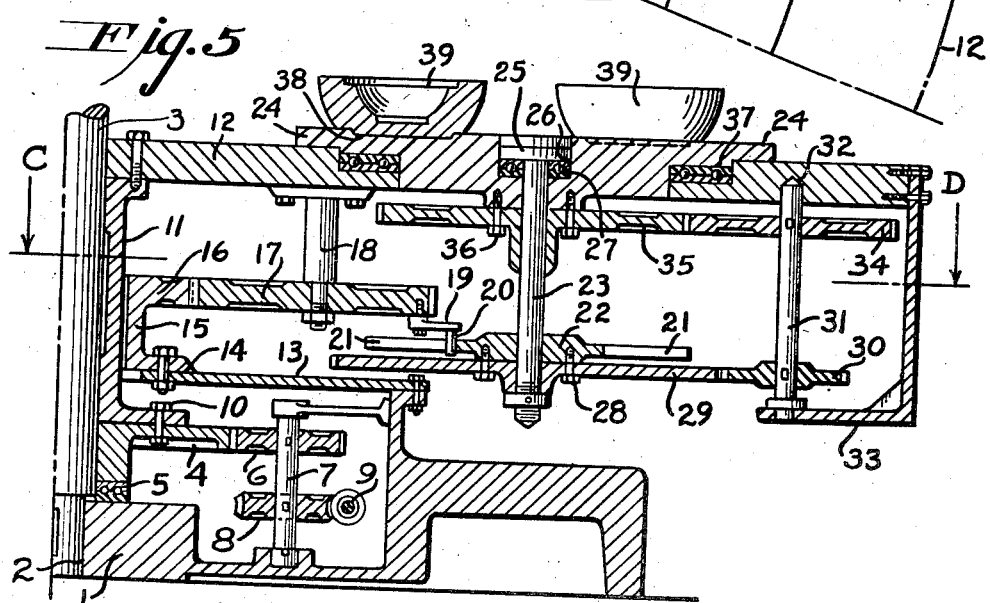
Fig. 5 is a sectional elevation of the set of parts shown in Fig. 4, also aligned for facilitating the description of the mechanism.

The press comprises four groups of mechanism such as those described above, as may be seen in the plan view of Fig. 1, and a single group following the same radial direction is shown in Figs. 4 and 5.

Figure 2:
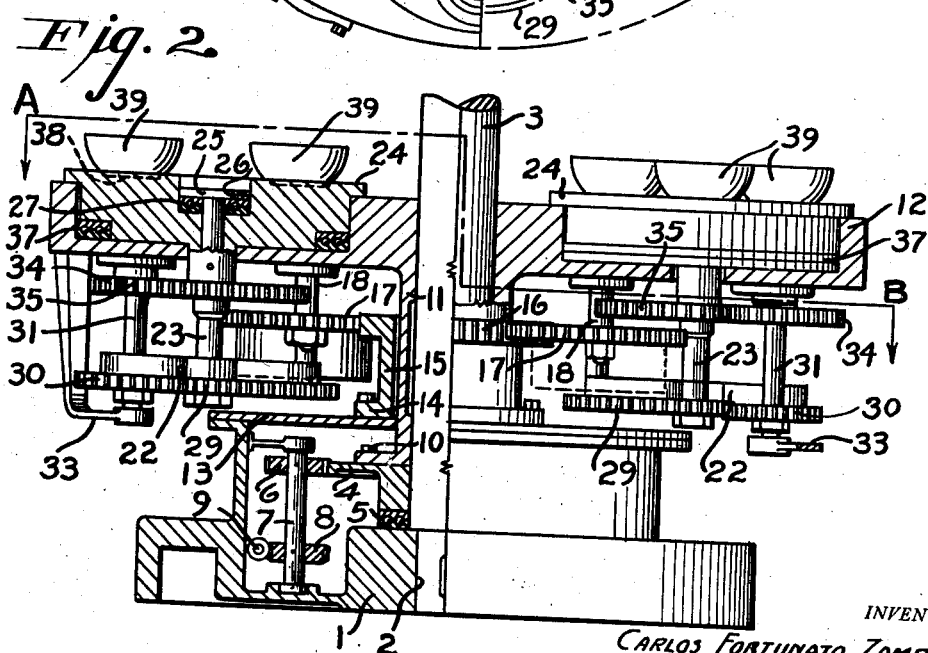
Fig. 2 is an elevational view, partly in section, of the lower portion of the press, including the rotary platform or table, showing the relative position of the parts of the mechanism.
Figure 3:
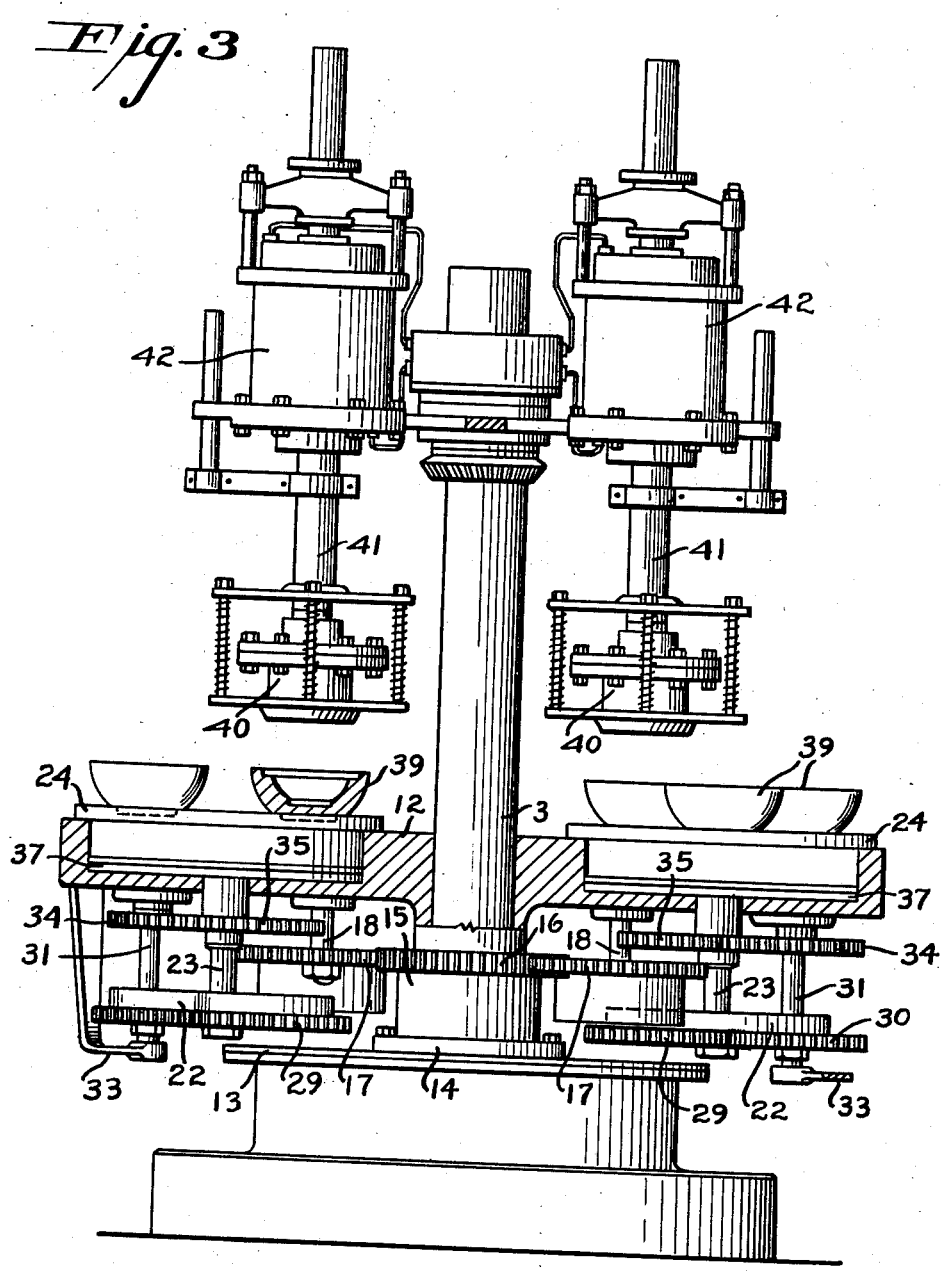
Fig. 3 is an elevational view of a continuous press with the respective male press members and the pneumatic cylinders for operating the same.

While the arrangement so far described serves the purpose of explaining the general principle of the system of the present invention, the several parts must be arranged in practice as shown in Figs. 2 and 3 so that the movement of the mold be in kinematic equilibrium with the movement of the table when the mold passes the charging line. As can readily be determined by calculation, this requires the location of the mold be at a distance from the center of the machine equal to 4.8 times the radius of the circumference on which the mold centers are located in the mold-carrying disc, since this is the distance from the center of the machine at which the instant rate of travel of a mold (or reference point) about its turret center and that of the table about its center are equal and at which time a charge can be introduced into a mold that is momentarily stationary. At such time a reference point $x$ (Fig. 1) represented by the mold center is in vertical register with a point $x'$ on the table which is also at the instant in vertical register with the fixed glass charging point X (Fig. 6) along the line X—X' that is at the specified distance from the machine center.

The press is also provided with male pressing members located near the column and in the radial plane of the axis of the mold-carrying disc or turret, said male-members being aligned with the respective molds when the latter are stopped at the point nearest the column. These male pressing members are shown at 40 in Fig. 3, and are supported by stems 41 having secured thereto the pistons sliding in cylinders 42. The male pressing members and cylinders rotate together with the platform or table 12 and are provided with means for raising or lowering them relative to the table, according to the articles being pressed. As is well known, there is also provided a series of valve arrangements timed with the movement of the table, for establishing air pressure circuits operating the male pressing members at the proper time.

Figures 6, 7, 8:
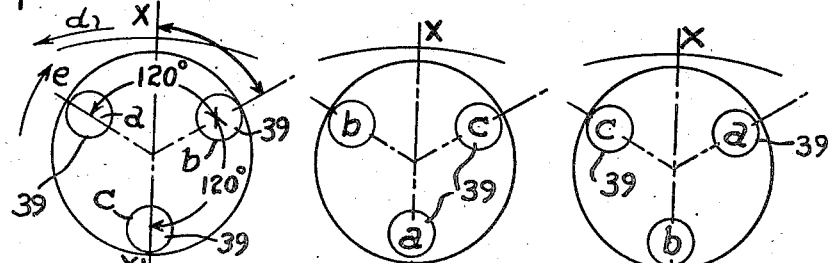
Figs. 6, 7 and 8 show schematically the different relative positions assumed successively by the molds during each of the cycles of operation.

The operation of the press will now be described. Figs. 6, 7 and 8 show the positions successively assumed by each of the three molds 39 arranged on a mold-carrying disc or turret 24. In order to identify the position of each of the molds, the latter will be designated by the reference characters a, b and c, and it will be assumed that the molten glass charging station is located at a fixed reference point indicated at X above the line X—X', the molds being located as shown in Fig. 6. The table 12 will rotate constantly at uniform speed in the direction of the arrow d. At a given time the mold-carrying disc or turret 24 will start rotating in the direction of the arrow e, carrying with it the mold which occupies position a in Fig. 6. The same moves through an arc of 240° due to the combination of movements referred to hereinafter, and is brought to the position a in Fig. 7. During this translation movement, the center of the mold will have crossed the line X—X' at a speed which in that instant will be equal and in opposite direction to the speed imparted to said mold center by the table 12, whereby said speeds will balance each other and the charge of molten glass is effected in perfect centered condition whereafter the mold proceeds to occupy the position a shown in Fig. 7, where it will stop.

In this position near the machine column, the mold indicated at a has remained aligned with the male pressing member, whereupon the pressing of the glass charge will take place. Thus, in the position shown in Fig. 7 there will be a molded article in the mold a, while the mold b will be ready to receive a charge of molten glass. At a given moment the mold-carrying disc or turret 24 will again start rotating through an arc of 240°, so that mold b will have passed by the charging station under the same conditions as mold a, whereas mold a will have moved under the male pressing member to occupy the position shown in Fig. 8 and will again move towards the periphery of the table 12 where it will stop. With the mold a in this position, the molded article is removed therefrom, while the male pressing member will act in the mold b so as to mold another article and the mold c will be ready to receive the charge of molten glass on the next rotational motion.

The intermittent movements mentioned above are performed by the use of a Geneva gear mechanism. As will be seen from the drawings, there are as many Geneva gear mechanisms as there are mold-carrying discs in the press (four in the embodiment illustrated) and said Geneva gear will rotate an angle of 90° for each complete revolution of the platform and in turn, as mentioned above, the mold-carrying disc or turret 24 rotates through 240° each time the Geneva gear turns through 90°.

The transmission of these movements takes place as follows: The Geneva gear operating gear 17 meshes in a 1:1 ratio with the central fixed gear 16, so that for each turn of the table 12, the gear 17 will turn once on its shaft. This gear will in turn act through the corresponding pin 20 on the Geneva gear, entering smoothly through the end of a groove 21 thereof and leaving same also smoothly. This 90° rotation of the Geneva gear is transmitted to gear 29 which meshes with gear 30, mounted on shaft 31 and the rotation of which is transmitted by the pair of gears 34—35 to the mold-carrying disc. In order to meet the condition mentioned above, the coefficient of transmission between the Geneva gear 22, gear 29 assembly and the gear 35 should be 8:3, for which purpose the coefficient of transmission of the pair of gears 29—30 is 4:1, and that of the pair of gears 34—35 is 2:3. Under such conditions, when the Geneva gear and the gear 29 thereof turn through 90°, the gear 35 and the connected mold-carrying disc will rotate through 240° on the basis of which the operative cycles take place as explained above.

It is evident that in carrying out this invention, many changes, modifications and/or alterations will occur to those skilled in the art, without departing from the scope of the inventions as clearly set forth in the appended claims.

What I claim is:

1. A mechanical movement which includes a table, a turret supported by said table near the periphery thereof, means for rotating said table continuously, a chain of table driven gears adapted to rotate the turret about its own axis in a direction opposite to the direction of rotation of said table over a path such that reference points on said table and turret periodically pass a fixed reference point and including indexing means adapted to effect rotation of said turret in step-by-step fashion at a varying angular velocity momentarily reaching a linear velocity equal to that of the table, the ratio of said gears and the characteristics of said indexing means being so arranged that the reference points on said table and turret cyclically and simultaneously reach the fixed reference point at the same linear speed so that the reference point on said turret momentarily remains substantially at a standstill whenever the respective reference points are in register with one another.

2. A mechanical movement according to claim 1, wherein the indexing means is of the Geneva type.

3. A mechanical movement according to claim 2, wherein one of the gears employed to rotate the turret is fixed with respect to the table and arranged concentric to the table axis.

4. A mechanical movement according to claim 3, wherein two of the table driven gears are centered about the turret axis.

5. A mechanical movement according to claim 4, which includes a shaft depending from the table and two gears fixed thereto arranged in mesh with the two gears centered about the turret axis.

6. In a mechanical movement according to claim 1, in which the indexing means includes a gear fixed with respect to said table, a gear carried by the table in mesh with said fixed gear and provided with a drive crank, a Geneva gear carried by the turret with which said crank is cooperative, and a chain of gears for transmitting movement of said Geneva gear to said turret.

7. In a glassworking apparatus, a rotatable table, a turret carried by said table rotatable about a center parallel to the table axis, a plurality of molds on said turret equally spaced from one another about the turret axis, means for continuously rotating said table, means adapted to turn the turret in step-by-step fashion in one direction through a range of velocities such that the linear velocity of a mold about the turret center equals the linear velocity of the table portion over which the mold is oriented as both reach a common fixed reference point so that from time to time each of said molds remains at a standstill momentarily upon reaching such point.

8. In a glass working apparatus, a rotatable table, a plurality of rotatable mold-carrier elements spaced equidistant from each other with their axes passing through a circle concentric to the table axis, means for continuously rotating said table about its axis, and associated mechanical means including a gear train containing a Geneva gear rotatable through a 90° angle for each revolution of the table to intermittently impart to each of said elements predetermined turning movements in a direction reverse to that of the table.

9. A mechanical movement comprising a rotatable table, a rotatable turrent mounted on said table, means for continuously rotating said table and drive means including a stationary gear centered about the table axis and a chain of gears associated with said table to impart intermittent rotation to said turret in a direction reverse to that of the table.

References Cited in the file of this patent

UNITED STATES PATENTS

| Number | Name | Date |
|---|---|---|
| 1,611,155 | Bisaillon | Dec. 21, 1926 |
| 2,224,653 | Lane et al. | Dec. 10, 1940 |
| 2,393,265 | Richardson et al. | Jan. 22, 1946 |